(12) United States Patent
Jackson

(10) Patent No.: US 8,180,728 B2
(45) Date of Patent: May 15, 2012

(54) AREA-SPECIFIC RELOAD OF DATABASE

(75) Inventor: Gary Lewis Jackson, Charlotte, NC (US)

(73) Assignee: BMC Software, Inc., Houston, TX (US)

( * ) Notice: Subject to any disclaimer, the term of this patent is extended or adjusted under 35 U.S.C. 154(b) by 298 days.

(21) Appl. No.: 12/563,657

(22) Filed: Sep. 21, 2009

(65) Prior Publication Data

US 2011/0071984 A1 Mar. 24, 2011

(51) Int. Cl.
*G06F 7/00* (2006.01)

(52) U.S. Cl. ........ 707/610; 707/613; 707/619; 707/637; 707/640; 707/655

(58) Field of Classification Search .................. 707/610, 707/613, 615, 616, 619, 624, 637, 640, 655, 707/658, E17.001, E17.005, E17.044, 999.204
See application file for complete search history.

(56) References Cited

U.S. PATENT DOCUMENTS

| | | | | |
|---|---|---|---|---|
| 6,026,412 A * | 2/2000 | Sockut et al. | ........................... | 1/1 |
| 6,732,123 B1 * | 5/2004 | Moore et al. | ........................... | 1/1 |
| 6,950,834 B2 * | 9/2005 | Huras et al. | .................... | 707/610 |
| 7,035,851 B1 * | 4/2006 | Sinclair et al. | ........................ | 1/1 |
| 7,657,584 B2 * | 2/2010 | Kawamura et al. | ............ | 707/610 |
| 7,765,180 B2 * | 7/2010 | Tamatsu | ................................ | 1/1 |
| 7,783,605 B2 * | 8/2010 | Meyerson | ..................... | 707/655 |
| 2006/0036618 A1 * | 2/2006 | Shuma et al. | ................. | 707/100 |
| 2006/0085488 A1 * | 4/2006 | Kitsuregawa et al. | ........ | 707/200 |
| 2007/0016582 A1 * | 1/2007 | Kawamura et al. | ............... | 707/7 |
| 2007/0143313 A1 * | 6/2007 | Cotner et al. | ................. | 707/100 |
| 2007/0143380 A1 * | 6/2007 | Plow et al. | ..................... | 707/206 |
| 2008/0228802 A1 * | 9/2008 | Marshall | ....................... | 707/102 |
| 2010/0036890 A1 * | 2/2010 | Kawamura | .................... | 707/200 |
| 2010/0281006 A1 * | 11/2010 | Scholtz | ........................... | 707/703 |

OTHER PUBLICATIONS

Long, Rick et al. "IMS Primer." IBM Corporation: San Jose, CA. 2000. pp. 1-300.

* cited by examiner

*Primary Examiner* — Robert Timblin
*Assistant Examiner* — Randall Burns

(57) ABSTRACT

A hierarchical database stores data for the database in a plurality of areas. A disclosed technique allows reorganization of one or more areas of the database without stopping the entire database. The areas to be reorganized are first stopped, then the areas are unloaded, reorganized, and reloaded, before restarting the reorganized areas. In-memory control blocks for the areas are updated to indicate to the database software that the areas have been reorganized, without stopping the entire database.

22 Claims, 5 Drawing Sheets

AREA-SPECIFIC RELOAD OF DATABASE

BACKGROUND

This disclosure relates generally to the field of computer databases. More particularly, but not by way of limitation, it relates to a technique for reorganizing a hierarchical computer database.

Computer databases have been an important part of enterprises for decades. Two major types of computer databases are hierarchical databases and relational databases. Unlike relational databases, organized into tables of rows and columns, hierarchical databases are organized into tree-like hierarchical structures representing logical data relationships. The most recognized and widely used hierarchical database system is the Information Management System (IMS) marketed by International Business Machines Corporation (IBM).

One form of IMS database is known as a Fast Path database, and is optimized for extremely high transaction rates. Data Entry DataBases (DEDBs) are one type of Fast Path database, originally designed for the management of customer accounts in large banks, but now used for many other kinds of applications where high volumes of transactions are required.

Data in a DEDB database is stored on disk drives in a plurality of Virtual Storage Access Method (VSAM) datasets, each known as an area. The IMS database system allows a database to contain up to 4096 areas, each of which may be 4 GB in size. The areas are relatively independent of each other, and multiple areas may be processed in parallel, reducing run times for such things as overnight batch processes and other tasks that involve processing on an entire database.

The way in which records are assigned to areas is controlled by database administrators. Data is typically grouped so that data with different characteristics are stored in different areas, allowing different disk space definitions for different areas to achieve optimal performance. For example, separate areas may be used for records for which processing is done on different cycles.

From time to time, a database administrator may reorganize all or parts of the database for various reasons, such as to improve performance of the database. There are two kinds of reorganization: (1) physical restructuring to optimize the physical storage of the database, and (2) logical restructuring to optimize the database logical structure. Physical restructuring may be performed to reorganize the existing physical storage datasets on disk for better performance or to alter the physical storage, such as to change the size of the dataset holding an area of the database. Logical restructuring may be performed to modify the hierarchy of the various database fields, such as to add additional fields to the database or to change the size of one or more fields.

In conventional DEDB databases, one area cannot be reorganized without stopping the entire database. Such events may be traumatic for an organization using the database for high availability, high transaction rate processing, and may take a significant amount of time in limited time windows of opportunity. Enterprises running such databases have long desired a way to avoid such total shutdowns of a hierarchical database, and may delay needed reorganizations to avoid such shutdowns, allowing reduced performance or database functionality until such a total shutdown may be accomplished.

SUMMARY

In one embodiment, a method is disclosed. The method comprises stopping a first database storage area of a plurality of database storage areas of a hierarchical database; unloading data from the first database storage area; reorganizing the first database storage area; reloading the unloaded data to the reorganized first database storage area; and starting the first database storage area, wherein a second database storage area of the hierarchical database remains started while performing the acts of unloading, reorganizing, reloading, and starting the first database storage area.

In another embodiment, a system is disclosed. The system comprises a processor; a memory, coupled to the processor; and a storage subsystem, coupled to the processor. The storage subsystem comprises storage for a hierarchical database and storage for a hierarchical database software. The hierarchical database comprises a plurality of database storage areas. The hierarchical database software comprises instructions that when executed by the processor cause the processor to perform actions in accordance with claim 1.

In yet another embodiment, a computer readable medium is disclosed. The medium has instructions for a computer stored on it that when executed cause the computer to perform actions in accordance with claim 1.

In yet another embodiment, a networked computer system is disclosed. The networked computer system comprises a plurality of database systems. Each of the plurality of database systems comprises a processor; a memory, coupled to the processor; and a storage subsystem, coupled to the processor. The storage subsystem comprises storage for a hierarchical database software. The hierarchical database software comprises instructions that when executed by the processor cause the processor to perform actions in accordance with claim 1. The storage subsystem of a first database system of the plurality of database systems further comprises storage for a hierarchical database. The hierarchical database is shared by all of the plurality of database systems.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following description is written in terms of the most common type of hierarchical database, an IBM IMS Fast Path DEDB database, the techniques described are not limited to such embodiments, but may be employed in any database system in which a database administrator wishes to reorganize one or more portions of the database without stopping the entire database. The functionality described below may be achieved by the vendor of the database software, or may be implemented as a third-party add-on to the original vendor's database software, providing additional functionality beyond that provided by the original vendor.

Figure 1:
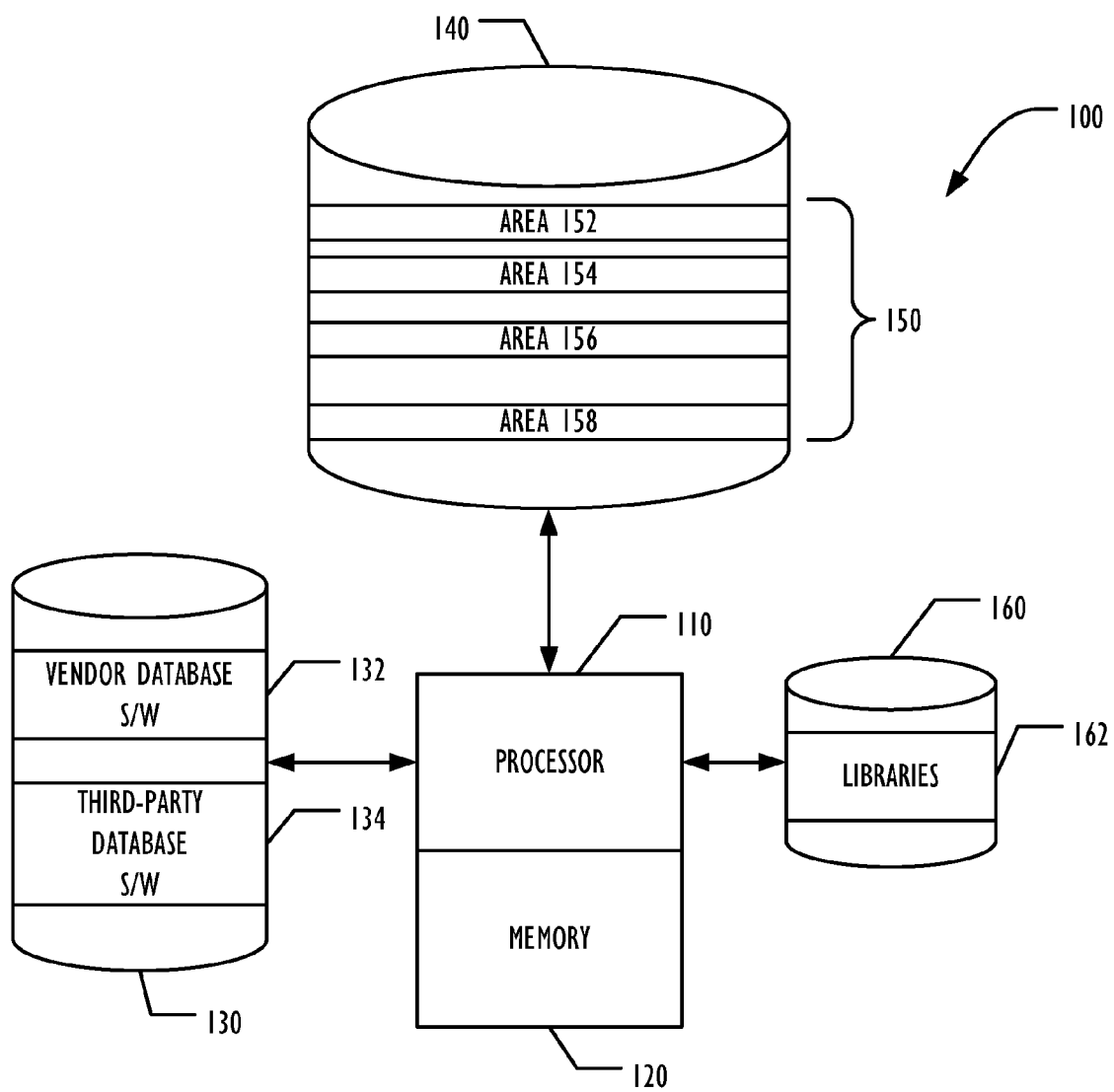
FIG. 1 shows, in block diagram form, an example of a computer system implementing a hierarchical database according to one embodiment.

FIG. 1 is a block diagram that illustrates a computer system 100 implementing a hierarchical database at a high level according to one embodiment. A processor 110, typically a mainframe computer processor, executes database software that provides access to and control of the hierarchical database. Data structures associated with the database software may be loaded into a memory 120 associated with the processor 110 for use by the database software executing on the processor 110. Although shown in FIG. 1 as a single processor 110 and memory 120, multiple processors 110 and memory units 120 may be used as desired, which may be coupled to each other using any coupling techniques known to the art. The nature of the processor 110 and memory 120 is outside the scope of this invention.

The database software 132 executed by the processor 110 may be stored on one or more disk drives 130 coupled to the processor 110. Similarly, libraries 162 of configuration information for the database system 100 may be stored on one or more disk drives 160 coupled to the processor 110. The physical storage for the data of database system 100 may be provided by one or more disk drives 140, where the VSAM datasets 152, 154, 156, and 158 are illustrated as providing physical storage for four areas that comprise the database 150.

Although the database 150 is illustrated as stored on a single disk drive 140, in some embodiments, different areas may be physically stored on one or more separate disk drives of a storage subsystem coupled to the processor 110. Disk drives 130, 140, and 160 may also be implemented as a single disk drive or multiple disk drives of a storage subsystem, and are shown on separate disks in FIG. 1 only for clarity. The physical configuration of the storage subsystem used to store the database 150, the database software 132, and the configuration libraries 162 is outside the scope of this invention.

Figure 2:
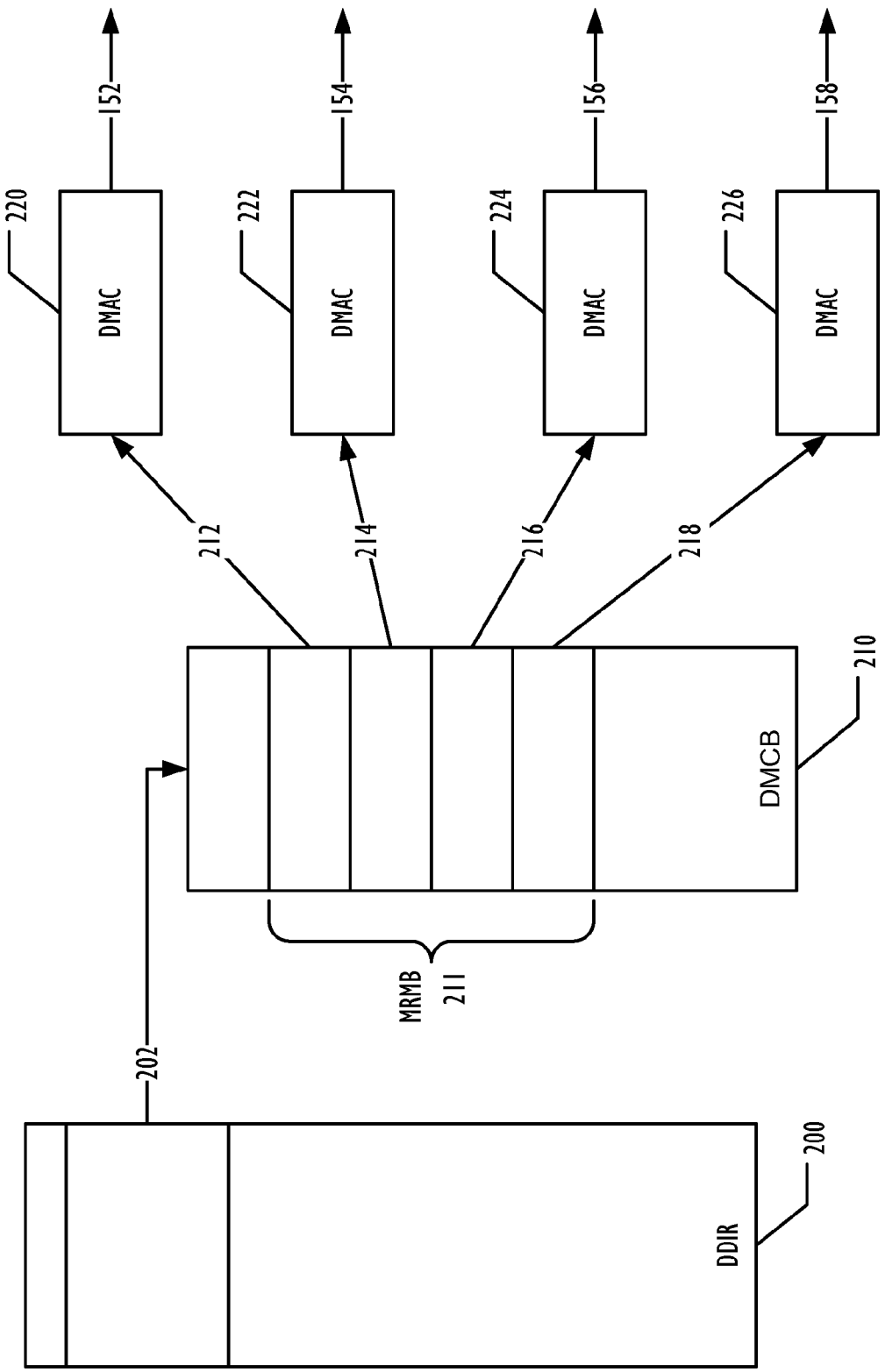
FIG. 2 shows, in block diagram form, an embodiment of data structures used for describing areas of a database according to one embodiment.

The database software 132 while executing on the processor 110 keeps numerous data structures in the memory 120 that define the configuration of the database. FIG. 2 is a block diagram that illustrates one embodiment of these data structures. Not all of the data structures used by the database software 132 are illustrated in FIG. 2, but only certain data structures or control blocks that are relevant to the current disclosure.

DDIR 200 is a data structure that contains information related to the database 150 as a whole. One field in the DDIR 200 is a pointer 202 to another data structure, the DMCB 210. The DMCB 210 contains an MRMB section 211, which contains pointers to DMAC control blocks that describe each of the areas defined on disk 140 for the database 150. As illustrated in FIG. 2, MRMB 211 contains four pointers 212, 214, 216, and 218, which point to DMAC control blocks 220, 222, 224, and 226, respectively. A DMAC is a control block that points to and contains information about an area of the database 150 stored on the disk 140. In the example illustrated by FIG. 2, DMACs 220, 222, 224, and 226 define areas 152, 154, 156, and 158, respectively.

As indicated above, these control blocks may be kept in memory 120 while the database software 132 is executing. In one embodiment, when the database software 132 is configured for the database 150, a process known as "genning the database," data structures defined by the genning process are stored in the ACBLIB library 162 for use in starting and running the database 150.

Figure 3:
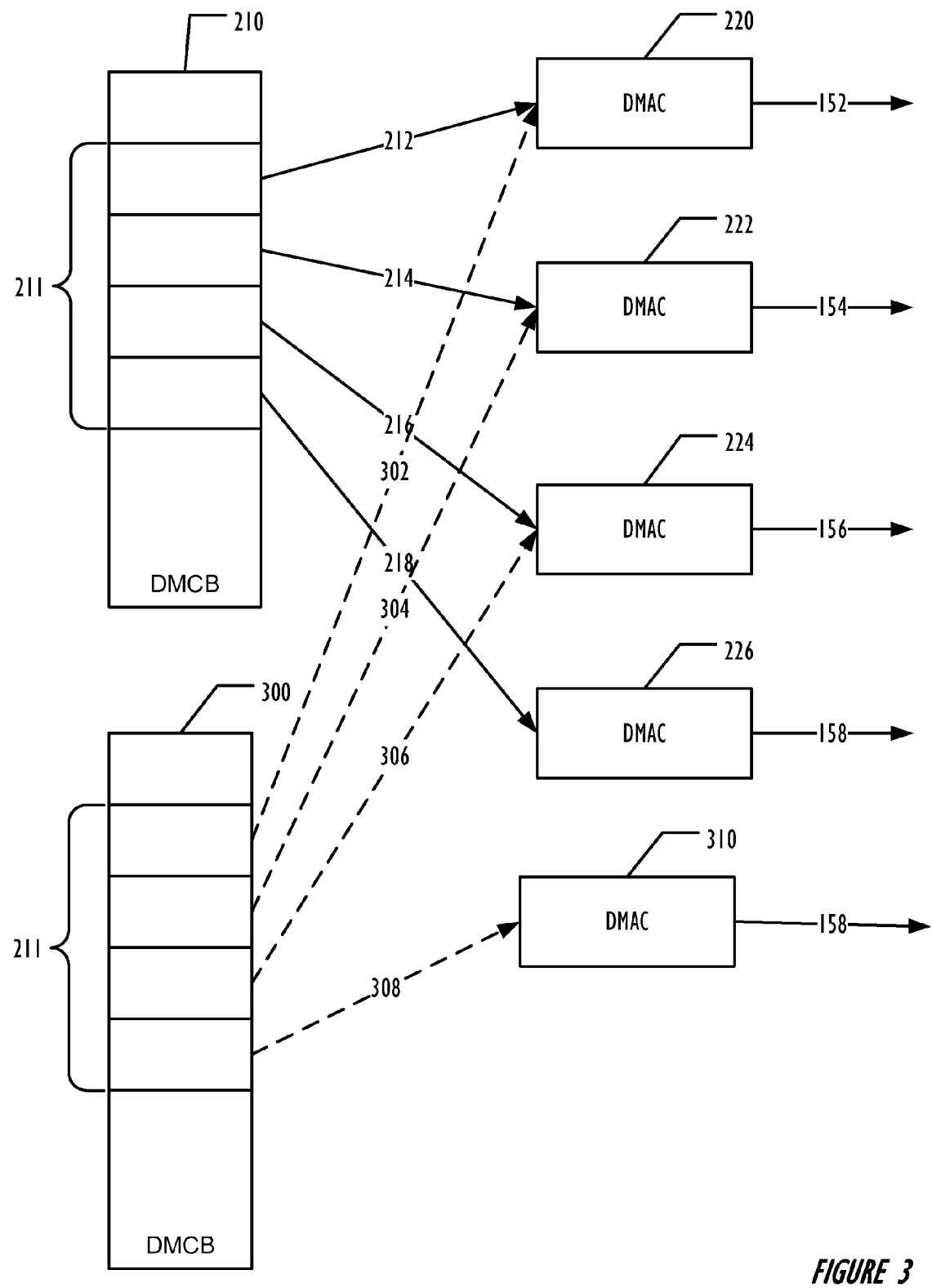
FIG. 3 shows, in block diagram form, updating the data structures of FIG. 2 to reorganize a portion of a database according to one embodiment.

FIG. 3 is a block diagram illustrating a technique for reorganizing an area of the database 150 without stopping the entire database 150 according to one embodiment. In this example, area 158 is being reorganized. DMCB 210 is the original DMCB in memory 120 before the reorganization of area 158, pointed to by pointer 202 of the DDIR 200. As in FIG. 2, pointer 212 of DMCB 210 points to DMAC 220 that describes area 152, pointer 214 points to DMAC 222 that describes area 154, pointer 216 points to DMAC 224 that describes area 156, and pointer 218 points to DMAC 226 that describes area 158. After the reorganization occurs, the DDIR pointer 202 points to the new DMCB 300, where the MRMB 211 contains pointers 302, 304, 306, and 308, pointing to DMACs 220, 222, 224, and 310. In this embodiment, the DMACs 220, 222, and 224 are unchanged, because areas 152, 154, and 156 are unchanged, but DMAC 226 is replaced with DMAC 310, which now describes reorganized area 158. Once the DMCB 300 data structure of FIG. 3 is relinked to the DDIR 200, then the area 158 may be restarted.

By stopping only area 158, the area being reorganized, downtime for database 150 may be reduced. Transactions that affect the other areas 152, 154, and 156 may continue unabated during the reorganization of area 158.

In one embodiment, during the reorganization of area 158, the database software 132 typically suspends any transactions that affect data stored in area 158, instead of failing the transactions. When area 158 comes back online, the suspended transactions may complete without the application(s) generating those transactions having to take any action. Therefore, the reorganization is transparent to users of the database 150.

In another embodiment, during the reorganization of area 158, the database software 132 will return an status code (FH) that indicates to the application transaction that the data in area 158 is not available. The application transaction can continue processing and take an alternative plan of action or it can fail the transaction. When area 158 comes back online, any transaction that needs to access or update area 158 is now able to complete. Therefore, the reorganization is not transparent to users of area 158 but is transparent to users of areas 152, 154, and 156, as they can still be accessed and updated.

Figure 4:
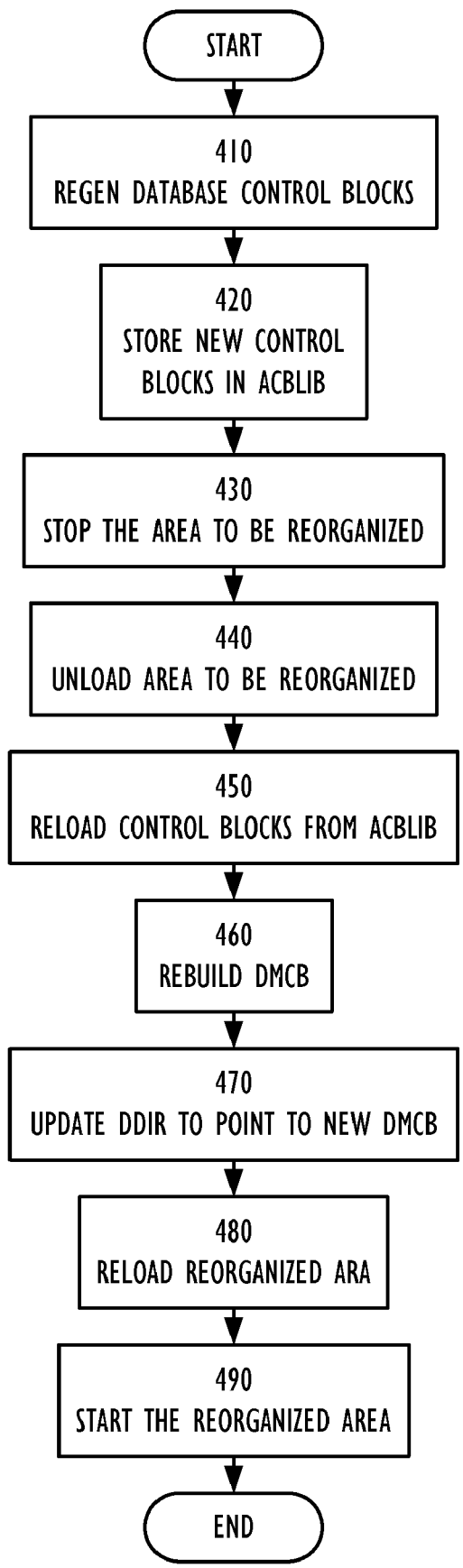
FIG. 4 shows, in flowchart form, an example process for reorganizing a portion of a database according to one embodiment.

FIG. 4 is a flowchart that describes a technique for performing the relinking of the control blocks described above according to one embodiment, allowing the reorganization of area 158 without stopping the entire database 150. The decision of when to reorganize area 158, the nature of the reorganization, and the selection of the area to be reorganized is outside the scope of the current invention, and is not further discussed herein.

In block 410, a DBDGEN procedure is run to regen the control blocks for the database 150, which are stored in the ACBLIB 162 in block 420. This DBDGEN procedure typically involves creating an assembler source code file with IMS macros to define the various control blocks for the database 150 that are stored in the ACBLIB 162. This source code file is then processed by the assembler program, generating the results that are stored in the ACBLIB 162.

In block 430, the area 158 to be reorganized is then stopped, causing any subsequent transactions against the area 158 to be suspended or to indicate that the area 158 is unavailable, depending on the embodiment. The remainder of the database 150 continues operating with no delay of transactions affecting only other areas. A transaction affecting both the stopped area 158 and another area (for example, area 154) may cause the transaction to be suspended in one embodiment, and in another embodiment, the transaction may fail, indicating that the area 158 is unavailable.

In block 440, the area 158 is unloaded, backing up the data stored in the area 158 to a backup area on some storage medium as desired, such as tape or disk, using standard operating system facilities. Once the unload is complete, the area 158 may be reorganized. The VSAM dataset may be recreated, moved, resized, reorganized, etc. as is determined advisable by the database administrator.

Now the process of rebuilding the control blocks for the area 158 begins. In block 450, the control blocks for the database 150 are loaded from the ACBLIB 162 into memory 120. Then in block 460, the new DMCB 300 may be created, looping through the MRMB 211 to examine each DMAC. Because areas 152, 154, and 156 were not reorganized, the DMACs in memory pointed to by old DMCB 210 may be copied over to the new DMCB 300 as the MRMB area 211 is processed in DMCBs 210 and 300. DMAC 226, however, may be replaced with new DMAC 310, which describes the reorganized area 158.

Once the creation of new DMCB 300 is complete, then the DDIR 200 may be updated in memory in block 470 to point to the new DMCB 300 instead of the old DMCB 210. During this action, the entire database 150 may be quested in one embodiment, halting transactions affecting all areas, but only for the short period (typically, much less than 1 second) needed to switch between DMCBs 210 and 300.

The area 158 may now be reloaded from the backup area created in block 440. Once the reload completes, then area 158 may be restarted in the database 150, allowing any new transactions to be processed against area 158. In embodiments where transactions that access or update area 158 were suspended, those transactions may now be allowed to complete.

Although in the above example only a single area 158 is reorganized, the same procedure may be used to reorganize multiple areas, stopping only the areas that are to be reorganized, while transactions against other areas continue to process.

In one embodiment, the database software 132 provided by the vendor does not contain the ability to perform the procedure outlined in FIG. 4. Instead, an add-on software 134 from a third-party vendor hooks into the database software 132 to provide the additional functionality. The description herein does not distinguish between an embodiment in which the partial reorganization capability is contained in the original vendor's database software 132 and one in which the capability is contained in the third-party add-on software 134, and references to "the database software 132" should be understood to include the third-party add-on software 134.

In some embodiments, the database software to reorganize an area may set conditions that disallow reorganizing an area without stopping the rest of the database 150. When processing a request to reorganize an individual area, the database software 132 in one embodiment may check those conditions and refuse to allow the partial reorganization if one or more of the conditions fail. For example, if the area to be reorganized was not stopped prior to attempting to update the control blocks for that area, the operation may be aborted. If more than one area is to be reorganized, in one embodiment a failure to complete the reorganization and updating of control blocks for one area may cause the failure of the reorganization of all areas. In such an embodiment, the software 132 may check to make sure the conditions are met for all reorganizations before making any changes to the in-memory control blocks, to avoid consistency problems that might develop if some but not all of the areas were reorganized.

Figure 5:
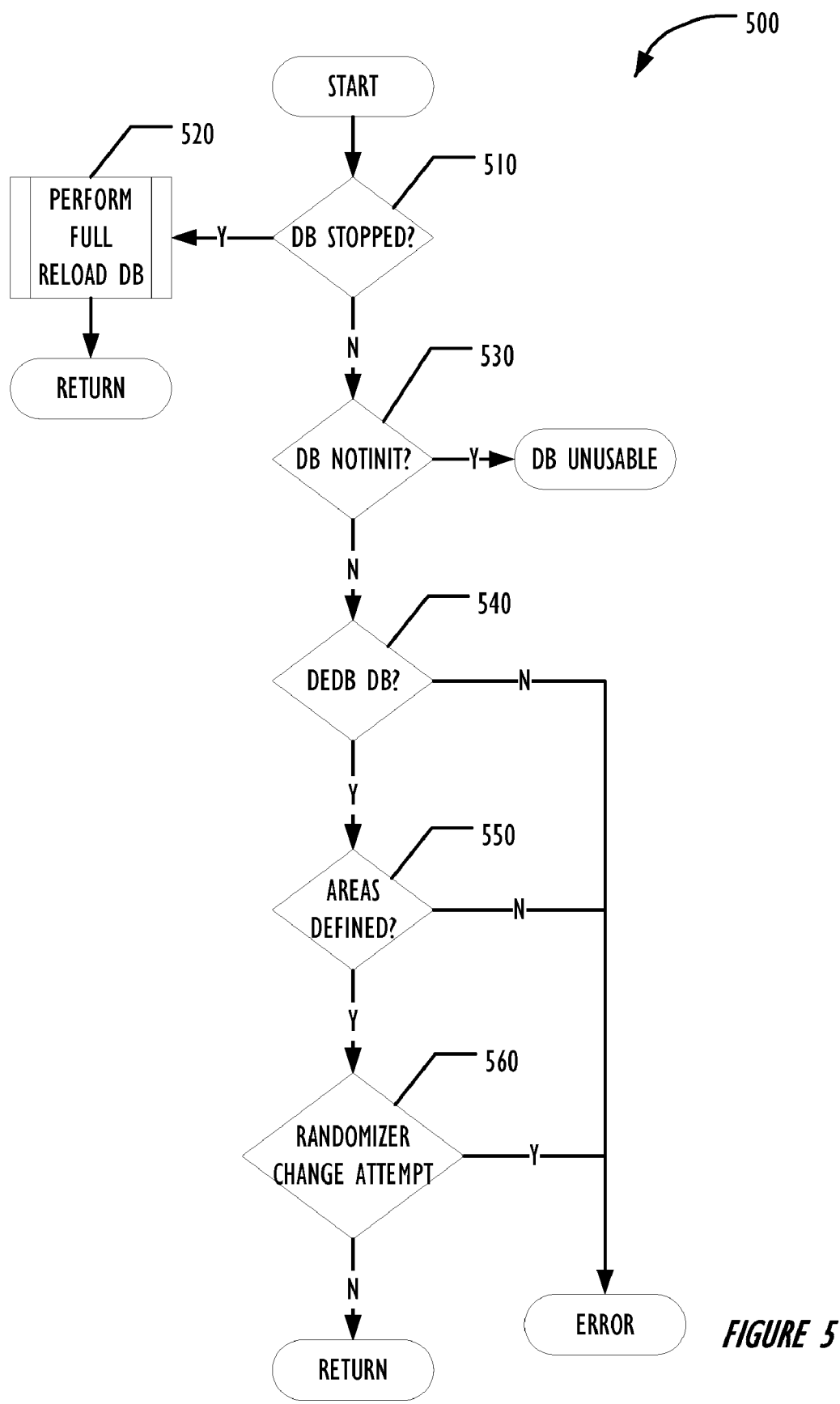
FIG. 5 shows, in flowchart form, an example process for checking whether a partial reorganization of a database may be performed according to one embodiment.

One embodiment of such a checking procedure is illustrated in FIG. 5. In block 510, the status of the database 150 as a whole may be checked. If the entire database 150 is stopped, then in block 520 a conventional reload of the entire database 150 may be performed. If the entire database 150 is not stopped, then in block 530 the database 150 may be checked to confirm that it has been initialized. If not, then the database 150 may be unusable.

In block 540, the database 150 may be checked to ensure that it is a Fast Path DEDB, and not some other type of database that does not have independent areas of physical storage, and cannot be partially reorganized by stopping a portion of the database. In block 550, the database 150 control blocks may be checked to ensure that some areas are defined for the database 150. In one embodiment, a randomizer function may be shared by all areas in the database 150, defining how data is spread within the VSAM datasets used to store the database 150 areas. Since only one randomizer function is used by the entire database 150, a reorganization of one area that attempts to change the randomizer may not be allowed.

If all of the above checks complete successfully, then the procedure described above for reorganizing the stopped area may be performed. In one embodiment, all areas that are stopped when the reorganization procedure is performed may be processed as described above.

In some embodiments, the same database 150 may be shared by multiple copies of the database software 132 running on different processors 110. In such an embodiment, the request to reorganize and reload the area 158 described above may be sent to all executing instances of the database software 132 that share the database 150 to be performed in the memories 120 corresponding to each of the processors 110.

By performing this in-memory manipulation of the DMCB and DDIR control blocks, a subset of the areas of the database 150 may be taken offline, reorganized, and then brought back online for transactions without taking the entire database 150 offline. Thus, transactions not involving the reorganized areas do not need to be suspended or blocked and may complete without interference by the reorganization of the other areas. Thus, the reliability, availability, and serviceability of the database 150 as a whole are enhanced.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   maintaining a first set of control blocks in a memory, representing information about a hierarchical database, wherein a first subset of the first set of control blocks corresponds to a first database storage area of a plurality of database storage areas and a second subset of the first set of control blocks corresponds to a second database storage area of the hierarchical database;
   stopping the first database storage area;
   unloading data from the first database storage area;
   reorganizing the first database storage area;
   generating a second set of control blocks in memory corresponding to the reorganized first database storage area;
   creating a new data structure in memory;
   copying into the new data structure pointers to the second subset of the first set of control blocks and pointers to the second set of control blocks;
   replacing a pre-existing data structure with the new data structure;
   reloading the unloaded data to the reorganized first database storage area; and
   starting the reorganized first database storage area,
   wherein the second database storage area of the hierarchical database remains started while performing the acts of unloading, reorganizing, reloading, and starting.

2. The method of claim 1, wherein starting the first database storage area occurs after the unloading, reorganizing, and reloading.

3. The method of claim 1, further comprising:
   suspending transactions that affect data stored in the first storage area during the unloading, reorganizing, reloading, and starting; and
   processing the suspended transactions after starting the reorganized first storage area.

4. The method of claim 1, wherein the act of copying pointers into the new data structure comprises:
   copying the pointers from the pre-existing data structure to the new data structure;
   determining that the first subset of the first set of control blocks corresponds with the reorganized first database storage area; and
   replacing pointers to the first subset of the first set of control blocks with pointers to the second set of control blocks.

5. The method of claim 1, further comprising:
   determining whether the first database storage area can be reorganized without stopping all of the plurality of database storage areas; and
   refusing to allow reorganization of the first database area when it is determined that the first database storage area cannot be reorganized without stopping all of the plurality of database storage areas.

6. The method of claim 5, wherein the act of determining whether the first database storage area can be reorganized without stopping all of the plurality of database storage areas comprises:
   determining whether the entire hierarchical database is stopped;
   determining whether the hierarchical database has been initialized;
   determining whether the hierarchical database is of a predetermined type;
   determining whether the first database storage area is defined in the hierarchical database; and
   determining whether an attempt is being made to modify a feature shared by all of the plurality of database storage areas.

7. The method of claim 5, wherein the predetermined type is an IMS fast path data entry database.

8. A system, comprising:
   a processor;
   a memory, coupled to the processor; and
   a storage subsystem, coupled to the processor, comprising:
     storage for a hierarchical database comprising a plurality of database storage areas; and
     storage for a hierarchical database software, comprising instructions that when executed by the processor cause the processor to perform actions in accordance with claim 1.

9. The system of claim 8, wherein the hierarchical database is an Information Management System (IMS) fast path data entry database.

10. The system of claim 8, wherein the hierarchical database software further comprises instructions for causing the processor to:
    suspend transactions that affect data stored in the first storage area during the unloading, reorganizing, reloading, and starting; and
    process the suspended transactions after starting the reorganized first storage area.

11. The system of claim 8, wherein the instructions for causing the processor to copying pointers into the new data structure comprise instructions that cause the processor to:
    copy the pointers from the pre-existing data structure to the new data structure;
    determine that the first subset of the first set of control blocks corresponds with the reorganized first database storage area; and
    replace pointers to the first subset of the first set of control blocks with pointers to the second set of control blocks.

12. The system of claim 8, wherein the hierarchical database software further comprises instructions that when executed by the processor cause the processor to:
    determine whether the first database storage area can be reorganized without stopping all of the plurality of database storage areas; and
    refuse to allow reorganization of the first database area when it is determined that the first database storage area cannot be reorganized without stopping all of the plurality of database storage areas.

13. The system of claim 12, wherein the instructions that cause the processor to determine whether the first database storage area can be reorganized without stopping all of the plurality of database storage areas comprise instructions that when executed cause the processor to:
    determine whether the entire hierarchical database is stopped; determine whether the hierarchical database has been initialized; determine whether the hierarchical database is of a predetermined type;
    determine whether the first database storage area is defined in the hierarchical database; and
    determine whether an attempt is being made to modify a feature shared by all of the plurality of database storage areas.

14. The system of claim 13, wherein the predetermined type is an IMS fast path data entry database.

15. A non-transitory computer readable medium with instructions for a computer stored thereon wherein the instructions cause the computer to perform actions in accordance with claim 1.

16. The computer readable medium of claim 15, wherein the hierarchical database is an Information Management System (IMS) fast path data entry database.

17. The computer readable medium of claim 15, wherein the hierarchical database software further comprises instructions for causing the processor to:
   suspend transactions that affect data stored in the first storage area during the unloading, reorganizing, reloading, and starting; and
   process the suspended transactions after starting the reorganized first storage area.

18. The computer readable medium of claim 15, wherein the instructions that when executed cause the processor to copying pointers into the new data structure comprises instructions that cause the processor to:
   copy the pointers from the pre-existing data structure to the new data structure;
   determine that the first subset of the first set of control blocks corresponds with the reorganized first database storage area; and
   replace pointers to the first subset of the first set of control blocks with pointers to the second set of control blocks.

19. The computer readable medium of claim 15, wherein the hierarchical database software further comprises instructions for causing the processor to:
   determine whether the first database storage area can be reorganized without stopping all of the plurality of database storage areas; and
   refuse to allow reorganization of the first database area when it is determined that the first database storage area cannot be reorganized without stopping all of the plurality of database storage areas.

20. The computer readable medium of claim 19, wherein instructions that cause the processor to determine whether the first database storage area can be reorganized without stopping all of the plurality of database storage areas comprise instructions that cause the processor to:
   determine whether the entire hierarchical database is stopped; determine whether the hierarchical database has been initialized; determine whether the hierarchical database is of a predetermined type;
   determine whether the first database storage area is defined in the hierarchical database; and
   determine whether an attempt is being made to modify a feature shared by all of the plurality of database storage areas.

21. A networked computer system, comprising:
   a plurality of database systems, each comprising:
      a processor;
      a memory, coupled to the processor; and
      a storage subsystem, coupled to the processor, comprising:
         storage for a hierarchical database software, comprising instructions that when executed by the processor cause the processor to perform actions in accordance with claim 1,
   wherein the storage subsystem of a first database system of the plurality of database systems further comprises:
      storage for a hierarchical database comprising a plurality of database storage areas, and
   wherein the hierarchical database is shared by all of the plurality of database systems.

22. The networked computer system of claim 21, wherein hierarchical database software of the first database system notifies the hierarchical database software of the other database systems of the plurality of database systems to perform actions in accordance with claim 1.

* * * * *